Feb. 7, 1967   J. W. ERICKSON   3,303,369
DYNAMOELECTRIC MACHINES
Filed Dec. 18, 1963

WITNESSES:
John L. Chopp
Edward F. Possessky

INVENTOR.
John W. Erickson
BY
F. P. Lyle
ATTORNEY

United States Patent Office 3,303,369
Patented Feb. 7, 1967

3,303,369
DYNAMOELECTRIC MACHINES
John W. Erickson, Long Beach, Calif., assignor to Westinghouse Electric Corporation, Pittsburgh, Pa., a corporation of Pennsylvania
Filed Dec. 18, 1963, Ser. No. 331,436
5 Claims. (Cl. 310—168)

This invention relates to dynamoelectric machines, and more particularly to generators having a high ratio of length to diameter.

As the ratio of length to diameter ($L/D$) of a dynamoelectric machine increases, and in particular a generator of the Lundell type, the cost of electrical and magnetic components and therefore the cost of machine manufacture per horsepower normally decreases. There is thus a significant economic basis for the development and production of dynamoelectric machines in which the $L/D$ is comparatively high.

In the Lundell type of machine, the rotor comprises a plurality of axially extending, circumferentially spaced, interdigitated magnetic poles. Such machines may be classified as internal flux return path or external flux return path machines depending upon whether the return path for the excitation flux is external or internal of the rotor. Although Lundell-type dynamoelectric machines have many advantages, including high power output for a given size, high speed rating and the feasibility of eliminating brushes or slip rings, the $L/D$ ratio has been limited to about 1 for the external path machine and to about ⅓ for the internal path machine primarily because of magnetic saturation in the entry regions to the rotor poles. Such limitation on the $L/D$ ratio is not only economically disadvantageous but in addition is disadvantageous from a performance standpoint since greater power ratings can be achieved for a given speed or rotor diameter in a Lundell alternator as the $L/D$ ratio increases.

It is, therefore, a principal object of the invention to provide a novel dynamoelectric machine in which heretofore existing power-speed limitations are overcome, particularly by the use of novel rotors having high $L/D$ ratios.

A further object of the invention is to provide a novel Lundell machine having a significantly increased ratio of length to diameter by solving or avoiding the problems which have heretofore limited this ratio in prior machines.

Another object of the invention is to provide a novel machine which can have an increased $L/D$ ratio through multiple use of the same magnetic flux.

Briefly stated, and without limitation, the present invention comprises an elongated rotor having several axially spaced sets of axially extending, circumferentially spaced, interdigitated magnetic poles, with the poles rotating within corresponding stator cores supplied with appropriate stator windings. Excitation winding means are provided polarizing the rotor poles in alternate series relation with the stator cores and the rotor is preferably supported upon bearings adjacent its opposite ends.

The foregoing, and other objects, advantages, and features of the invention, and the manner in which the same are accomplished, will become more readily apparent upon consideration of the following detailed description along with the accompanying drawings, wherein.

Figure 1:
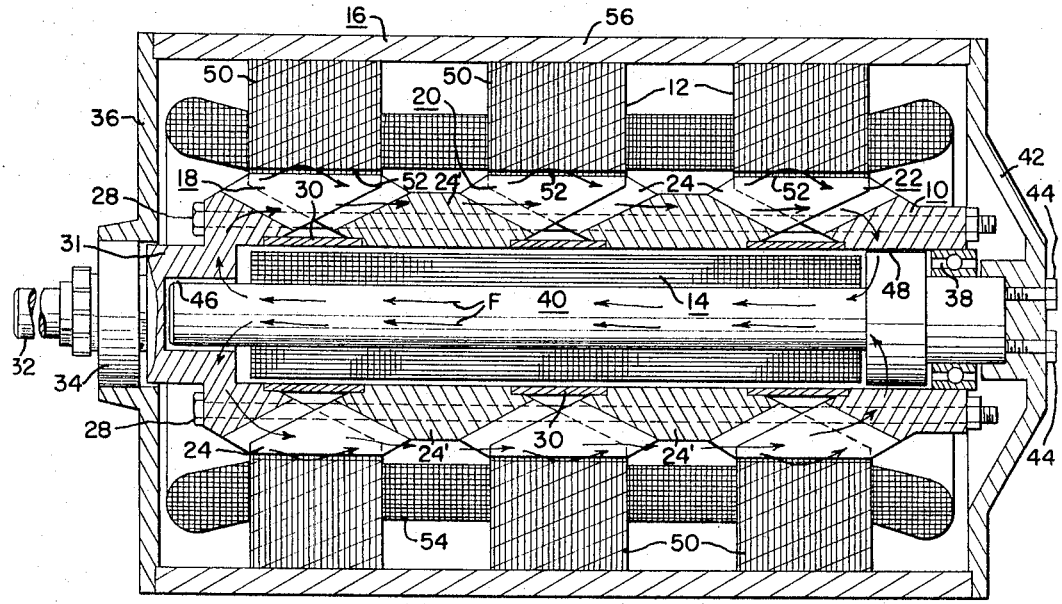
FIGURE 1 is a longitudinal sectional view of a preferred form of the invention for a Lundell-type machine of the internal flux return path category.
Figure 2:
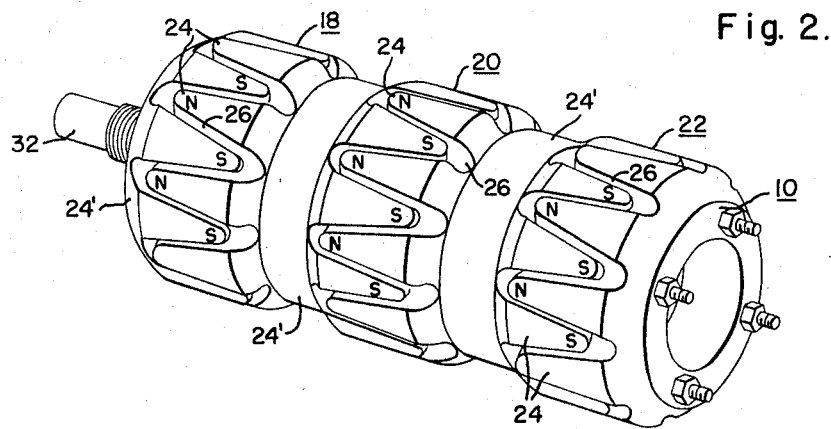
FIG. 2 is a perspective view of a rotor for the machine of FIG. 1.

With reference to the drawings, and initially to FIG. 1 thereof, in a first embodiment a machine or alternator comprises a rotor 10, a stator 12, excitation coil means or a coil 14, and a casing or housing 16 in which the foregoing parts are disposed. As shown in FIG. 2, the rotor 10 comprises three axially spaced paired sets 18, 20 and 22 of axially extending, circumferentially spaced, interdigitated magnetic poles or teeth 24 which can be formed from iron for example. Each set of poles comprises a set or series of teeth extending in a first axial direction from an annular root 24' alternating with a set of teeth extending in the opposite axial direction from another annular root 24'. The second and third pole sets as well as the fourth and fifth pole sets have a common root 24'.

Corresponding teeth 24 in the respective sets are preferably aligned. All of the poles or teeth 24 are preferably tapered in elevation as well as in plan and the pole sets are spaced from each other by a suitably dimensioned "non-magnetic" gap 26 (FIG. 2) so as to minimize leakage flux.

The rotor assembly can be held together by non-magnetic axial bolts 28 (FIG. 1) which pass through the roots 24' of the teeth. Non-magnetic annular inserts 30 can be employed as spacers and to some extent as a supporting aid for the teeth 24. In addition, although not shown here, the gaps 26 can be filled with a non-magnetic material, such as aluminum, to unite the entire rotor 10 into an integral and rigid structure.

One end of the rotor 10 is provided with a hub 31 affixed to a shaft 32 which preferably is formed from a non-magnetic structural material and which further is mounted for rotation in a bearing 34 supported upon one end plate 36 of the housing 16. Since the housing is not required to provide any magnetic circuitry for machine operation, it can and in many applications should be formed of a non-magnetic material so as to reduce leakage between adjacent stator cores.

The other end of the rotor is fixed to the outer race of a bearing 38, with the inner race of the bearing fixed to one end of a magnetic core 40. Thus, the bearing arrangement for the rotor is essentially balanced or symmetrical, one bearing being provided at each end of the rotor. Further, as will subsequently become apparent, the bearings are located substantially outside of the excitation flux path.

The magnetic core 40 is mounted upon an opposite housing end plate 42, such as by non-magnetic screws 44, and extends centrally of the rotor 10 through an open end thereof and further supports the elongated excitation coil 14 which is suitably energized with direct current. As indicated by the arrows F, the magnetic flux created by the excitation coil extends along the core 40 and across narrow annular gaps 46 and 48 adjacent the ends of the core, to polarize the magnetic poles or teeth 24 with successive pole sets having opposite polarity as shown in FIG. 2. The end of the core 40 in proximity to the gap 48 has a stepped configuration so as to provide a gap of suitably small transverse dimension and further to accommodate the bearing 38.

The stator 12 has a plurality of laminated magnetic cores 50 mounted on side wall 56 of the housing 16 in confrontation with respectively corresponding pairs 18, 20 and 22 of rotor pole sets and providing narrow annular rotor-stator gaps 52 about the rotor poles. The stator also has a winding or windings 54, the conductors of which are placed in axially extending slots of the cores 50 in accordance with conventional techniques. The stator windings can have an appropriate circuit arrangement, such as three-phase Y or delta connection.

The excitation magnetic flux, as previously noted, is directed along the excitation coil core 40 and traverses the gap 46 to polarize the pole sets and finally re-enters the core 40 across the gap 48. The polarization of the rotor poles 24 occurs as a result of the flux path through the poles 24 between the gaps 46 and 48. Specifically, the flux is directed from the gap 46 through the hub 31 into the adjacent set of poles 24 and then across the rotor-stator gap 52 to link with the windings of the confronting stator core 50. The flux then recrosses the same gap 52 into the next set of poles 24 which is interdigitated with the first set. The spacing between these interdigitated pole sets along the rotor 10 is thus made sufficient to deter the transmittal of flux directly between the interdigitated poles without linkage with the windings of the confronting stator core 50. Some leakage normally occurs, but the design is preferably arranged to minimize such leakage within the overall design goals.

From the second set of poles 24, the flux is directly transmitted to the third pole set through the connecting common root 24'. The flux then traverses the rotor-stator gap 52 to the stator core 50 in confrontation with the third pole set. The balance of the flux path to the return gap 48 is characterized in a manner similar to that so far described, and it is thus observed that in essence multiple flux linkages with the stator 12 are obtained by multiple use of the same series flux. This is to be distinguished from equivalent flux linkages obtained from single use of multiplied flux established in a widely cross-sectioned path since the number of linkages that can be obtained in the latter case is limited by magnetic saturation in a machine of given diameter and can be increased normally only by increasing the machine diameter. In contrast, by the terms of the present invention, flux linkages are readily increased by increasing the machine length which is far more advantageous because of the resulting increase in the $L/D$ ratio.

Thus, the dynamoelectric machine of FIG. 1 can be economically manufactured and further can be used as an alternator with comparatively improved operating characteristics of speed and power when the shaft 32 is driven by a suitable prime mover. The excitation current for the coil 14 can be obtained by rectifying a portion of the A.C. output from the stator windings 54, as by the use of a conventional semiconductor bridge rectifier circuit. As the rotor 10 commences rotation, the residual magnetism in the rotor poles produces an alternating current output from the stator windings, and this causes a build-up of the excitation field until the A.C. output from the stator attains the desired value. The stator windings associated with the respective cores 50 can be connected additively to obtain the desired high power output.

While a preferred embodiment of the invention has been shown and described, it will be apparent to those skilled in the art that changes can be made without departing from the principles of the invention. Accordingly, it is desired that the invention be not limited by the embodiment shown but rather that it be accorded an interpretation consistent with the scope and spirit of its broad principles.

What is claimed is:

1. A dynamoelectric machine comprising a hollow rotor disposed within a stator and having a plurality of axially spaced interdigitated sets of axially extending and circumferentially spaced magnetic poles, said stator including a plurality of stator cores supported non-magnetically and axially spaced so as to be associated respectively with said rotor pole sets, and means for exciting said magnetic poles with polarizing flux in a serial magnetic path which alternately includes said rotor pole sets and said stator cores progressively in the axial direction, said excitation means comprising a coil mounted within said rotor upon a fixed magnetic core extending axially of the rotor.

2. A dynamoelectric machine comprising a hollow rotor disposed within a stator and having a plurality of axially spaced interdigitated sets of axially extending and circumferentially spaced magnetic poles, said stator including a plurality of stator cores supported non-magnetically and axially spaced so as to be associated respectively with said rotor pole sets, and means for exciting said magnetic poles with polarizing flux in a serial magnetic path which alternately includes said rotor pole sets and said stator cores progressively in the axial direction, said excitation means comprising a coil mounted within said rotor upon a fixed magnetic core extending axially of the rotor, means for supporting said core adjacent one end thereof, said core spaced from said rotor by respective annular gaps adjacent opposite ends of the core.

3. A dynamoelectric machine comprising a hollow rotor disposed within a stator and having a plurality of axially spaced interdigitated sets of axially extending and circumferentially spaced magnetic poles, said stator including a plurality of stator cores supported non-magnetically and axially spaced so as to be associated respectively with said rotor pole sets, and means for exciting said magnetic poles with polarizing flux in a serial magnetic path which alternately includes said rotor pole sets and said stator cores progressively in the axial direction, said excitation means comprising a coil mounted within said rotor upon a fixed magnetic core extending axially of the rotor, means for supporting said core adjacent one end thereof, said core spaced from said rotor by respective annular gaps adjacent opposite ends of the core, said rotor mounted upon a pair of bearings adjacent its opposite ends, one of said bearings supported by said magnetic core.

4. A dynamoelectric machine comprising a housing and a stator and rotor cooperatively disposed therein, said housing having end plates, said rotor having a plurality of axially spaced interdigitated sets of axially extending and circumferentially spaced magnetic poles, said stator including a plurality of stator cores supported non-magnetically and axially spaced so as to be associated respectively with said rotor pole sets, and means for exciting said magnetic poles with polarizing flux in a serial magnetic path which alternately includes said rotor pole sets and said stator cores progressively in the axial direction, said excitation means comprising a coil mounted within said rotor upon a fixed magnetic core extending axially of the rotor, means for supporting said core adjacent one end thereof in relation to one of said housing end plates, said rotor mounted upon a pair of bearings adjacent opposite ends thereof, one of said bearings mounted on said core and the other of said bearings mounted on the other housing end plate.

5. A Lundell-type rotor comprising a plurality of axially spaced interdigitated sets of axially extending and circumferentially spaced magnetic poles, each set of poles comprising a first plurality of poles extending in one direction from a first annular root and another plurality of poles extending in the opposite direction from another annular root, the oppositely extending poles of at least one pair of adjacent sets having the same root, said rotor having a hub at one end supported upon a first bearing, the other rotor end being open and supported upon a second bearing.

References Cited by the Examiner
UNITED STATES PATENTS

| | | | |
|---|---|---|---|
| 588,602 | 8/1897 | Rice | 310—168 |
| 876,943 | 1/1908 | Canfield | 310—168 |
| 2,108,662 | 2/1938 | Fisher | 310—168 |
| 3,183,387 | 5/1965 | Wasynczuk | 310—156 |
| 3,223,916 | 12/1965 | Shafranek et al. | 310—168 |

MILTON O. HIRSHFIELD, *Primary Examiner.*

L. L. SMITH, *Assistant Examiner.*